July 30, 1929.  H. E. BRUNNER  1,722,494
ART OF FORMING MATCHABLE BEARINGS
Original Filed March 23, 1927  2 Sheets-Sheet 1
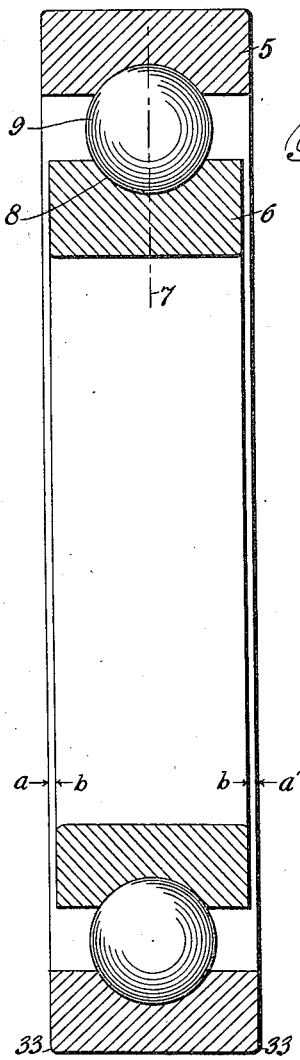
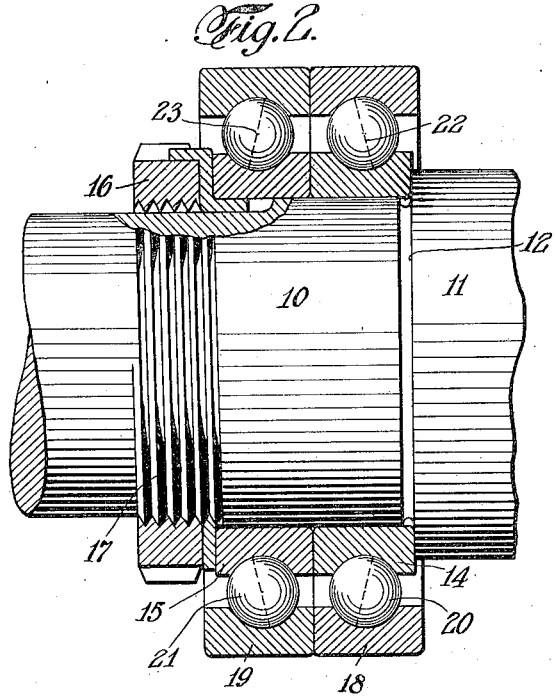
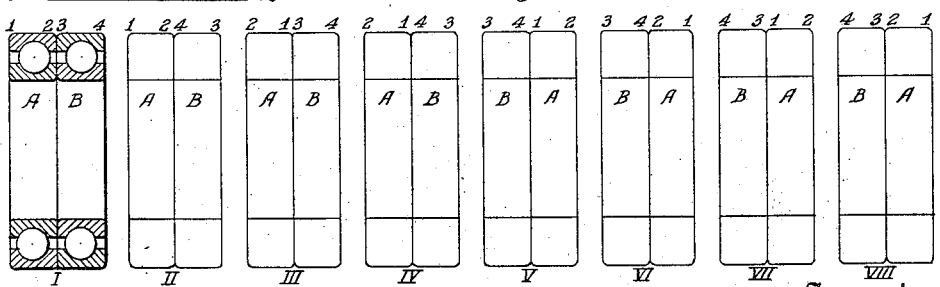
Inventor
Harold E. Brunner
By his Attorney

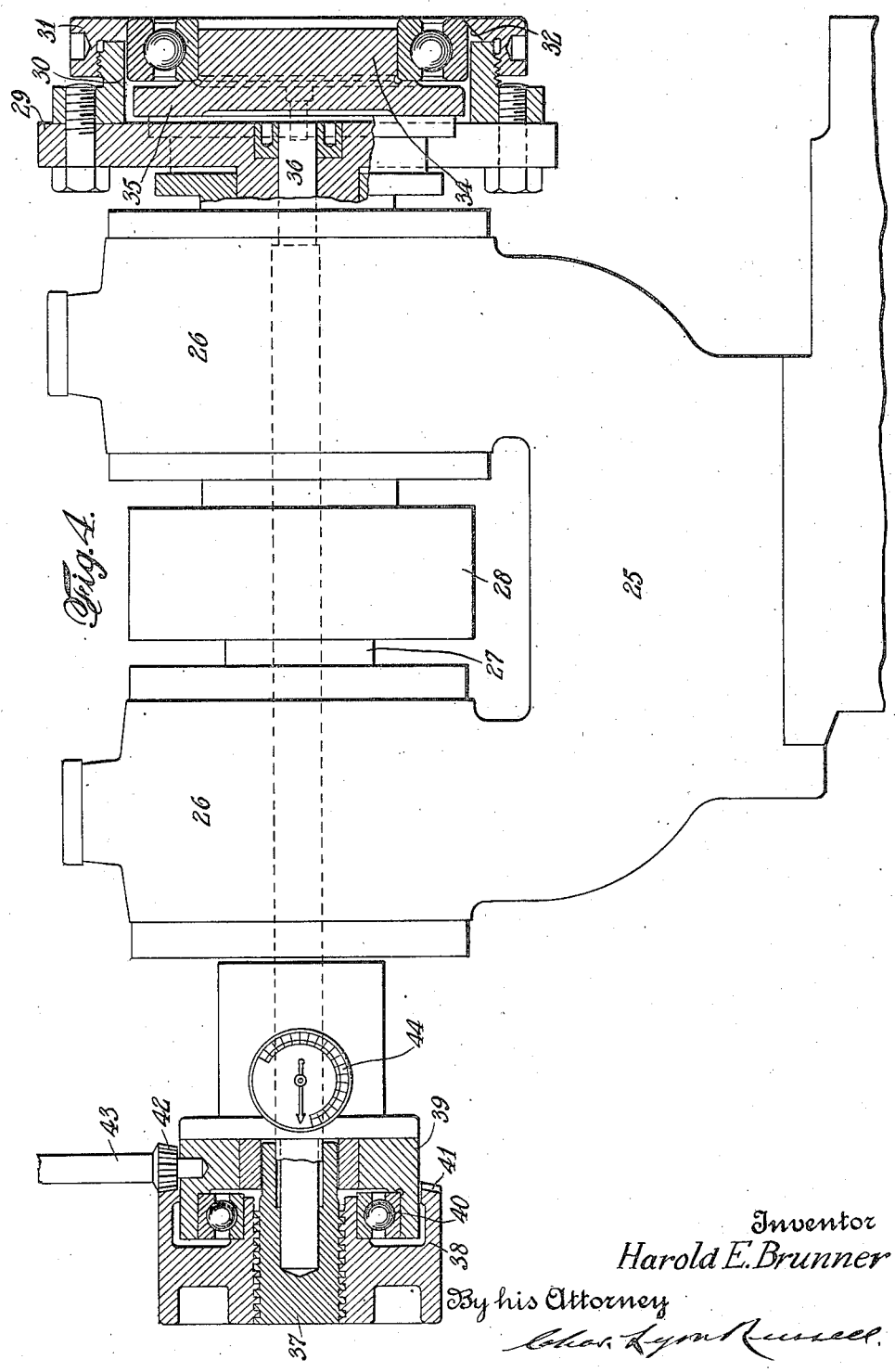

Patented July 30, 1929.

1,722,494

UNITED STATES PATENT OFFICE.

HAROLD E. BRUNNER, OF LARCHMONT, NEW YORK, ASSIGNOR TO THE HESS-BRIGHT MANUFACTURING COMPANY, OF PHILADELPHIA, PENNSYLVANIA, A CORPORATION OF DELAWARE.

ART OF FORMING MATCHABLE BEARINGS.

Original application filed March 23, 1927, Serial No. 177,478. Divided and this application filed February 3, 1928. Serial No. 251,486.

This application is a division of my copending application Serial No. 177,478, filed March 23, 1927.

The object of this invention is to produce an anti-friction bearing of such construction that when two of these bearings are mounted side by side a predetermined amount of force will be required to clamp them together, and when so clamped, internal loads will be set up in the bearings, one result is that the rolling elements being balls these are moved into positions theoretically assumed by balls in the grooves when the bearings are subjected to axial load in opposite directions, the points of ball contact being on oblique lines.

Reference is made to the accompanying drawings for a more complete understanding of the invention, in which drawings, Figure 1 represents the bearing in axial section, the difference however in widths of the inner and the outer ring being exaggerated.

Fig. 2 represents an axial section of a pair of bearings made in practicing my invention and mounted upon a portion of a shaft shown in elevation, the relative difference between the rings of these bearings being also exaggerated.

Fig. 3 illustrates the eight different ways in which a pair of bearings such as those illustrated in Fig. 2 may be mounted on a shaft, and Fig. 4 is an elevation partly in axial section of a machine which may be used in practicing this invention.

For the purpose of stabilizing a rotary part, for instance a high speed spindle, it has been proposed to mount the spindle or other part on a pair of ball bearings disposed side by side and by placing shims between either the inner or the outer rings and clamping the unshimmed rings together, taking up not only incidental looseness and also any capability of yielding under such loads as the part is expected to place on the bearings. Others to accomplish this result have resorted to lapping the meeting side faces of the inner or the outer rings of a pair of bearings an amount calculated to be sufficient to give the desired effect. Both of these practices are but workshop expedients of uncertain value, not only in the original assembly of the machine, but more especially in reassembly whenever the machine is taken apart. Assuming that a shim of the requisite thickness were originally selected or that the requisite amount were lapped off the rings, there is no assurance that the original shim will be replaced, or that the bearings will be placed together in the original order.

The eight different ways in which a pair of bearings may be assembled on a shaft is illustrated in Fig. 3, and will be described more in detail later in this specification.

The bearing made by practicing my invention is illustrated in exaggerated form in Figure 1. This bearing is shown comprising an outer ring 5, which will be assumed to be of standard S. A. E. dimensions, and an inner ring 6 which upon each side of the center line 7 of the ring and of the race groove 8 is narrower than the outer ring by an amount in excess of the S. A. E. tolerance. The bearing is represented of the deep groove single row Conrad type in which the series of balls 9 has a rather close fit. While the sides $a$ $a'$ of the outer ring 5 are shown disposed considerably outwardly of the sides $b$ $b'$ of the inner race 6, in practice the amount of difference will be measured within a few ten thousandths of an inch. While the drawings show the inner ring as the narrower, it is perfectly obvious that for different styles of mounting than that shown in Fig. 2, it may be desirable to make the inner ring the wider. I purpose so manufacturing these rings in quantities that it will require the application of the same amount of force to bring either of the respective sides of the narrower ring into the plane of the corresponding side of the wider ring in each of the bearings, so that when any two of these bearings, taken at random from the mass, are indiscriminately or interchangeably placed upon a shaft in any one of the eight possible relative positions, upon the application of predetermined pressure to the narrower rings, the wider rings will be clamped together and the narrower rings caused to meet; the balls of each set assuming angular contact with its associated rings and being under a predetermined amount of compression, the side faces of both inner rings and of both outer rings meeting on a common plane.

The amount removed or to be removed from the side of a ring is not measured by a certain fixed reduction in the width of the ring at its respective sides, as compared with the width of the corresponding sides of the other ring, but by the pressure or force necessary to bring the ground side of the ring to the plane of the corresponding side of the other ring.

When both sides of the similar rings of a pair of bearings are reduced to such an extent that the same pressure is necessary to bring each of the ground sides to the plane of the corresponding side of the other ring of that bearing, then one may be assured that the members of this pair can be matched or mated in any one of the possible permutations. My invention goes further than this; any bearing will match and mate with any other bearing having the same size and pressure displacement factor.

The advantage of this to the user is not only ease in reassembly but the possibility of replacing one bearing of a pair with another which will function correctly.

A pair of bearings made in accordance with my invention are shown mounted upon the journal 10 of a shaft 11, which journal is shown as of reduced diameter, a shoulder 12, resulting from such reduction. The inner rings 14 and 15 of the pair of bearings are represented as being the narrower rings and these are mounted on the journal 10, the ring 14 being pressed against the shoulder 12 and the ring 15 pressed against such ring 14 by means of a nut 16 engaging the screw thread 17 formed on the journal 10. The outer rings 18 and 19 are shown pressed together and the balls of each row 20 and 21 having oppositely inclined oblique contact lines represented by the dotted lines 22 and 23.

When a pair of similar bearings made in accordance with my invention are mounted as shown in Fig. 2, a predetermined amount of pressure from the nut 16 reacting against the shoulder 12 is required to bring the meeting faces of the narrower rings 14 and 15 together and into the common plane upon which the faces of the wider rings 18—19 meet.

Any two similar bearings having the same pressure displacement factor can be taken at random and mounted together on a shaft. The diagram of Fig. 3 shows in its positions numbers I to VIII the positions in which a pair of similar bearings A and B may be interchangeably and reversibly mounted upon a shaft such as that shown in Fig. 2. After the bearings have originally been selected and mounted and it becomes necessary to disassemble them or to remove one for replacement by another similar bearing it is not necessary that the bearings be assembled in any given relation one to the other because they may be assembled in any one of the possible positions.

While it is possible to manufacture the bearings in quantity in several different ways, yet I have found it expedient to adopt the method of assembling the bearing, that is, the rings and set of balls and a retainer, and while holding one ring against axial displacement, apply the predetermined amount of pressure to the other ring in an axial direction and grind its protruding side face into the plane of the side face of the ring which is held against movement, then reverse the ring and pursue the same method with the other side. It will then be possible to mount together a pair of bearings so formed whether they are made at the same time or at different times or at different places.

In carrying out this method I have found the apparatus illustrated in Fig. 4 to be of considerable assistance. Broadly, the parts of the mechanism of interest comprise a head 25 having a pair of bearing housings 26—26 in which is mounted a rotary spindle 27 shown as driven by means of a belt pulley 28. The front end of the spindle carries a chuck plate 29 which has a bore 30 slightly larger than the outer diameter of the outer ring of the bearing which is to be held. Such outer ring is held in position by means of a releasable screw threaded member 31, which has an inwardly flaring face 32 adapted to engage the usual chamfer at the edge of the outer ring (see 33 Figure 1). The bore of the inner ring of the bearing is shown as having a close fit with the hub portion 34 of the back plate 35 of the chuck, the side face of the inner ring resting against the face of this plate 35.

After the bearing has been mounted in the chuck a predetermined amount of pressure is applied to the inner ring and it is forced toward the right hand side in Fig. 4 against the resistance of the balls, the outer ring being forced against the face 32. This will cause the side face of the inner ring to extend outwardly beyond the side face of the outer ring, whereupon a suitable lapping or grinding wheel will be applied for reducing such outwardly protruding face of the inner ring. A suitable gauging device will be employed for indicating when the inner ring has been ground to the plane of the outer ring.

The means illustrated for applying the pressure is a rod 36 attached to the back side of the plate 35 and extending through the spindle 27 at the rear end of the machine where it fits in a socket of a block 37 having screw threaded connection with a nut 38 mounted for rotation on an extension 39 of the shaft 27, but held from longitudinal movement in relation thereto by means of a combined radial and thrust bearing 40. The nut member 38 is provided with gear teeth 41 which mesh with a pinion 42 carried by a removable key 43. The amount of pressure will be measured by means of some suitable gauge represented at 44. While the spindle 27 is at rest the operator applies the key 43 turning the pinion 42 and the nut 38 until the rod 36 forces the plate 35 and the inner ring mounted upon such plate and on the hub 34 forward under the predetermined desired pressure.

To those skilled in the art of manufacturing and of mounting anti-friction bearings, it will be obvious that it would be impossible to state in this patent application a table of pressures to be applied to the respective rings in grinding or lapping one to be narrower than the other, since this will have to be determined not only for each size of bearing but for each particular kind of service which each size of bearing is intended to perform. It will also be obvious that various other means may be employed for carrying out this method of manufacturing the bearings.

Having described my invention I claim and desire to secure by Letters Patent:

1. The art of producing matchable bearings, which consists in similarly treating both sides of each of a plurality of radial ball or roller bearings in the following manner, holding one race ring against axial displacement in one direction, then applying a predetermined axial pressure in the same direction to the other ring, and then grinding the side face of the pressed ring on the side toward which it is pressed and bringing it into the plane of the corresponding side face of the held ring.

2. The art of producing bearings, which consists in holding one race ring of a radial ball or roller bearing against axial displacement in one direction, then applying a predetermined axial pressure in the same direction to the other ring, and then grinding the side face of the pressed ring on the side toward which it is pressed and bringing it into the plane of the corresponding side face of the held ring.

Signed at New York, N. Y., this second day of February, 1928.

HAROLD E. BRUNNER.